Aug. 18, 1925. 1,549,774
D. C. KELLOGG
HOUSEHOLD MOTOR APPARATUS
Filed March 3, 1924 3 Sheets-Sheet 1
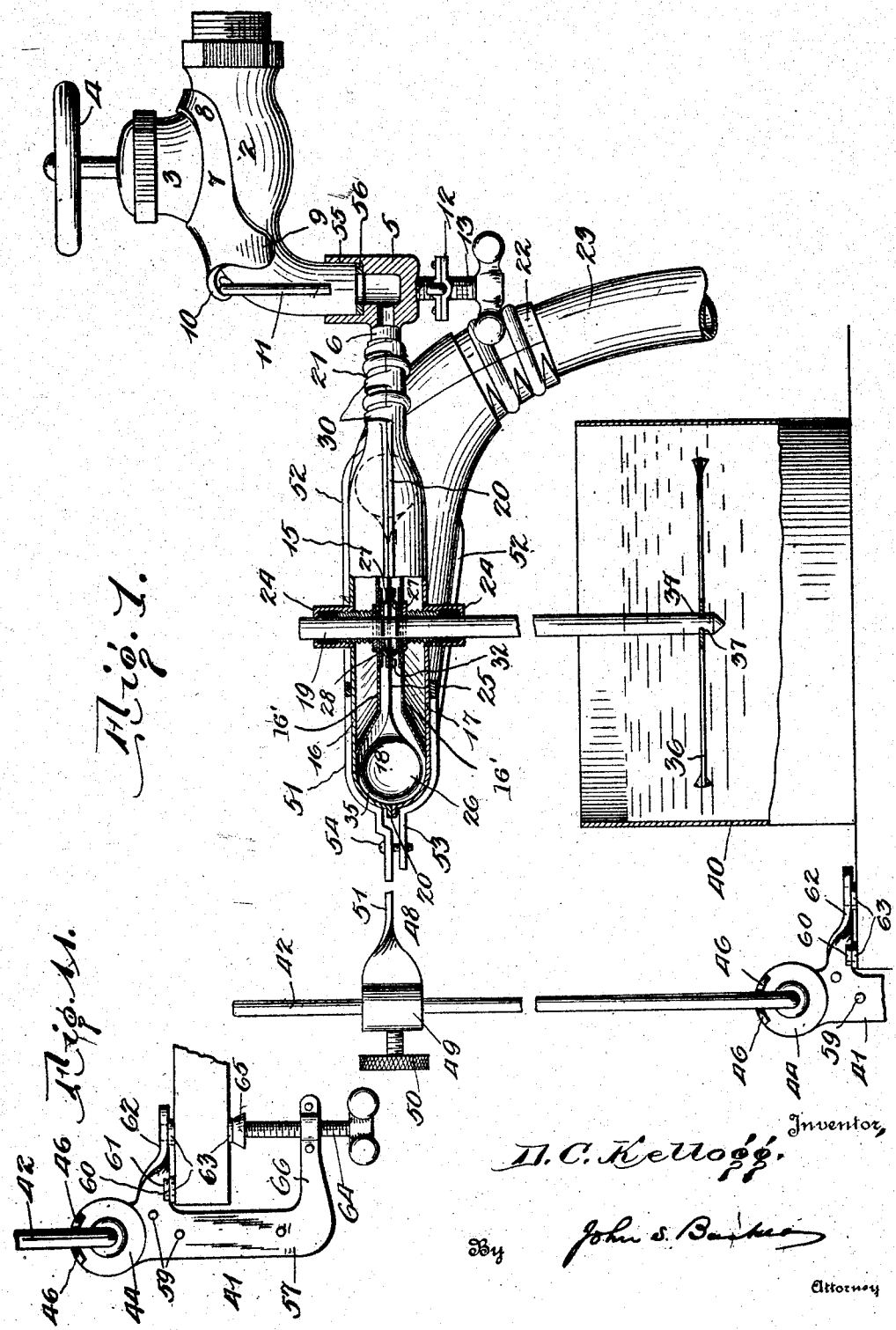

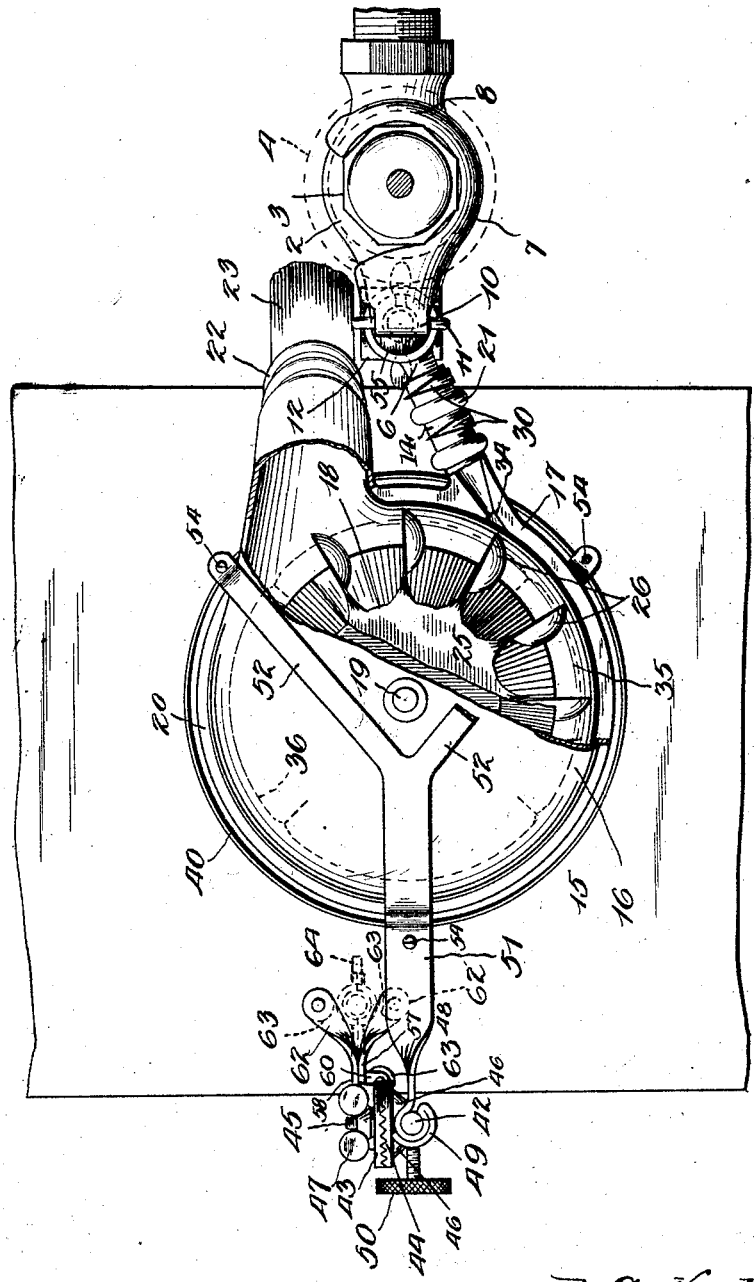

Aug. 18, 1925.
D. C. KELLOGG
1,549,774
HOUSEHOLD MOTOR APPARATUS
Filed March 3, 1924  3 Sheets-Sheet 3
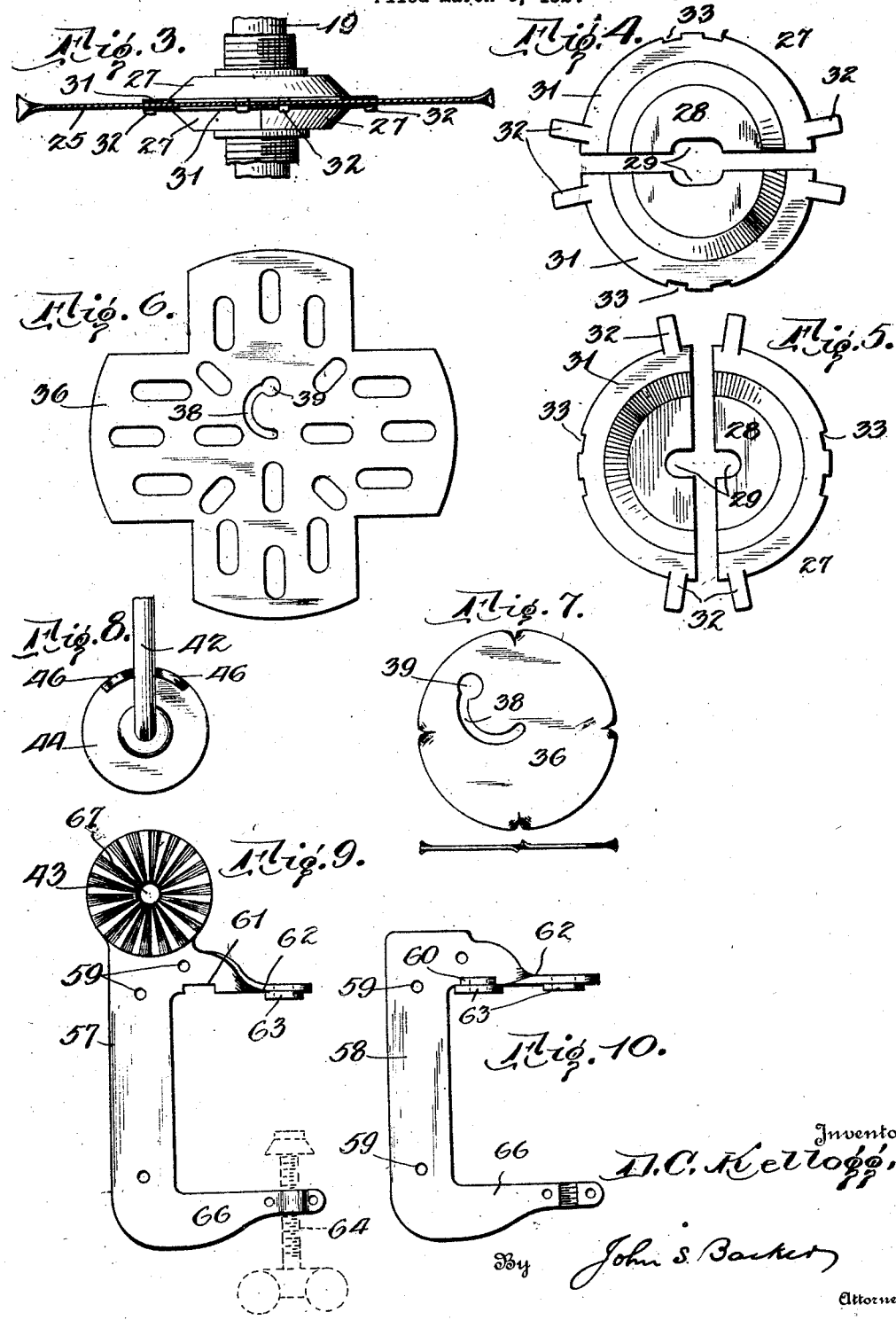

Patented Aug. 18, 1925.

1,549,774

UNITED STATES PATENT OFFICE.

DWIGHT C. KELLOGG, OF CARTHAGE, MISSOURI.

HOUSEHOLD MOTOR APPARATUS.

Application filed March 3, 1924. Serial No. 696,609.

*To all whom it may concern:*

Be it known that I, DWIGHT C. KELLOGG, a citizen of the United States, residing at Carthage, in the county of Jasper and State of Missouri, have invented certain new and useful Improvements in Household Motor Apparatus, of which the following is a specification.

My invention relates to household motor apparatus adapted to be connected with the water system of an apartment and to be operated by the flow of water therefrom, and to serve as a motor for light apparatus, such as household machinery, stirring and mixing devices, and the like.

It has for its object to produce apparatus of this kind that is simple in construction and not liable to get out of order, cheap of manufacture and easy to be applied to and removed from the connection through which the motor fluid that operates the apparatus is supplied.

In the accompanying drawings—

Figure 1 is a side elevation of apparatus embodying my invention set up and ready for use, parts being shown in section and other parts broken away.

Figure 2 is a top plan view of the same, parts being broken away.

Fig. 3 is a detail view in elevation illustrating the manner of connecting the rotor to the shaft which it drives.

Figs. 4 and 5 are detail views in plan illustrating the connecting disks employed to unite the rotor to its shaft.

Fig. 6 is a plan view of one form of agitator adapted to be secured to the driven shaft.

Fig. 7 illustrates another form of agitator showing it in plan and elevation.

Fig. 8 is a detail view of the lower end of the support for the motor.

Figs. 9 and 10 are views in elevation illustrating the two parts of the clamp by which the motor and the supporting part that carries the motor may be secured to a support.

Fig. 11 is a detail view in elevation, parts being broken away, illustrating the supporting bracket in use.

In the drawings 2 represents the faucet of a water system which may be of usual or preferred construction, that represented having a hub 3 containing the packing for the stem of the valve, which is provided with the usual handle, 4. 5 designates a separable coupling adapted to be applied to the delivery end of the faucet 2, where it is secured water tight. The coupling 5 is provided with a connection 6 to which is applied a flexible hose 14 uniting the coupling with the motor 15. To secure the coupling in place I provide a saddle piece 7 adapted to rest upon the upper side of the faucet. It is formed with a hook 8 shaped to encircle the hub 3 of the faucet, with lugs 9 that engage respectively with the faucet on its opposite sides and with an eye or bearing 10 in which is mounted a stirrup 11. The end of the stirrup opposite that mounted in the eye 10 carries a plate 12, or a pair of plates united to each other, in which is formed a threaded opening for the screw 13.

The parts thus far described are applied and used as follows: The coupling is slipped over the end of the faucet, which enters and fits fairly closely a chamber 55 formed in the upper or open end of the coupling, in the bottom of which is a packing 56 against which the delivery end of the faucet rests. The saddle then is applied to the faucet, as represented in Figs. 1 and 2, the stirrup 11 swung into the position represented in Fig. 1, and the screw 13 turned into engagement with the bottom of the coupling until it is forced into engagement with the packing 56, sealing the joint between the coupling and the end of the faucet.

The motor 15 has a casing formed of thin metal which may be stamped into shape to form a hollow shell, and comprising an upper part 16 and a lower part 17, these parts having flanges 20 around their marginal edges, which overlap and are secured together liquid tight in any well known manner. Within the casing thus formed is mounted a rotor 18 supported upon a shaft 19. The chamber in which moves the rotor is given shape for the most advantageous operation of the motor by providing the casing with inner casing members 16', 16' of suitable configuration and mounted in any preferred manner. The shaft is supported in bearings 24 suitably packed to be water tight. The rotor 18 is formed of a sheet of thin metal shaped to have a flat central disk 25 immediately surrounding the shaft and integral arms projecting therefrom and formed into cups 26 to receive the impact of the motor fluid delivered through the nozzle 34. In order to secure the rotor to the shaft 19 I shape the portion of the latter to which the rotor is secured so that it is non-circular in cross section, and interpose between this part of the shaft and the central flat or disk portion of the rotor divided clamping disks 27 located on opposite sides of the rotor, one above and the other below when the parts are arranged as represented in the drawings. The shaft 19 is preferably made non-circular by cutting slits therein as represented in Fig. 1 into which are set the edges of the clamping disks 27 surrounding the opening 29 therein. Each clamping or connecting disk 27 is divided centrally into two similar parts by a radial line to enable the disk to be applied to the shaft. Each section of a clamping disk has a central cupped portion 28 in which is half of the opening 29 in which fits the shaft. Around the raised or cupped part 28 is a marginal flat part 31. The clamping disks are provided with tangs 32, preferably integral therewith and located at the marginal edges of the flat annular portions 31 thereof. These tangs are long enough to extend through openings provided therefor in the central plate or disk 25 of the rotor, through recesses 33 formed in the opposite clamping disk and to have their ends bent over against the outer face of the said opposite disk, the clamping disks and rotor being thus united, and by the engagement of the clamping disks with the shaft, secured thereto.

The casing of the motor is provided with a connection 21 with which the hose 14 is adapted to engage and to which the latter is secured by flexible tongues 30. The hose connection 21 communicates with the nozzle 34 through which water or other motor fluid is directed against the blades or cups of the rotor. These move in the circular working chamber 35 within the motor casing, which chamber communicates with the delivery connection 22 to which is secured the hose 23 through which the fluid is discharged after having performed its work.

Power may be taken from the shaft for various purposes. I have represented it as serving to operate an agitator 36 adapted to work in a vessel 40, this illustration being typical of the work the apparatus is adapted to perform. Various forms of agitators may be applied to the shaft, or other working implements may be substituted therefor. To provide for the easy attachment and removal of such working implements I form in the shaft, which is preferably circular in shape, near its lower or working end, a pair of kerfs 37, cut part way through the shaft from opposite sides, as represented in Fig. 1. In the separable working implement 36 I form a slot 38, preferably curved and terminating at the center of rotation of such implement. The cross dimension of this slot is approximately equal to the distance between the inner parallel edges of the kerfs 37. The end of the slot distant from the axial center of the implement is enlarged as represented at 39, to permit the shaft end to pass into the slot. This having been done its kerfed or cut portion is caused to enter the narrow slot 38, along which it is moved until the opposite or closed end thereof is reached, when the implement will be properly centered and secured in working position upon the shaft.

The motor 15 is adapted to be secured to and supported by the sink over which is arranged the faucet 2, or a table, shelf or stand which may be located adjacent to the faucet, by means of a clamp 41. This I prefer to form of two parts, 57, 58, which are adapted to be united to each other side by side by rivets 59. Each part of the bracket carries an arm 62, and these diverge, the arms being arranged to overlie the support to which the clamp is applied. Opposite the arms and spaced therefrom are the arms 66 which preferably lie close side by side and have formed near their outer ends a threaded recess, preferably a part of each arm, to receive the stem of the clamp screw 64. The end or clamping head 65 of the screw 64 is faced with a washer or rivet 63 of lead or other relatively soft material, while the upper arms 62 of the clamp are provided with similar pieces, 63, these serving to insure the clamp having a good grip upon the support to which it is applied and also serving to prevent the clamp scratching the surface of such support. One of the parts of the clamp, 58, is provided, near the base end of the arm 62, with a lip 60 that projects toward the opposite part 57 and is adapted to rest in a recess 61 formed in the latter when the parts are united. This imparts strength and rigidity to the clamp. One of the parts of the clamp is provided at its upper end, and above the arms 62, with a fluted or serrated disk 43 through which is a central perforation 67.

42 designates a rod adapted to be carried by the bracket 41 and to extend upward therefrom and to serve as the support by which the motor 15 is carried. The lower end of the rod is bent at a right angle to the main upright portion thereof, as indicated at 45, and is screw-threaded. This portion of the rod extends through a disk 44 of a size preferably corresponding with the disk portion 43 of the clamp and serrated or roughened on one of its faces to adapt it to be brought into intimate engagement with the serrated or roughened face of said part 43. This bringing and holding together of the roughened disk-like parts 43 and 44 is secured by passing the screw-threaded end 45 of the supporting rod, after the disk 44 has been strung thereon, through the opening 67 in the disk 43, and then applying the nut 47 to the screw-threaded part 45 of the rod and by it drawing the two disk-like parts into close and intimate engagement with each other. In order to hold the rod 42 in an upright position the disk 44 is formed with a pair of spurs or lugs 46 between which lies the rod 42, as represented in Figs. 1, 2, 8, and 11.

A bracket 48 is supported upon the rod 42 and carries the motor 15. The bracket preferably comprises two bifurcated bars, the arms 52 of which engage with the casing of the motor on its opposite sides and hold it between them. One of the bars of the bracket has a horizontal arm 51, the outer end of which is shaped into a bearing 49 adapted to fit and encircle the rod 42, to which it is held clamped by means of a screw 50. The other bar of the bracket 53 is united with the bar 51 by a screw 54. The bars 51 and 53 with their diverging arms 52 are shaped to fit the exterior of the casing of the motor so that when they are applied to opposite sides of the latter and then united by the screw 54 the arms will fit the casing and securely hold between them the motor.

The apparatus which I have described may be assembled as follows:

The coupling 5 is applied to the faucet and secured as has already been described. The clamp 41 is then secured in place, to the sink, a table, or other support. The motor, to which has been secured the supporting bracket, may then be secured upon the rod or standard 42. The angular relation of the motor to its supporting bracket may be changed to suit the conditions of use by loosening the screw 54 and turning the motor casing in the bracket. So likewise the bracket may be adjusted relative to the supporting rod 42, both vertically and angularly, as circumstances of use may dictate.

The hose connections may now be made, that for the supply of motor fluid extending from the connection 5 to the union or connection 21 of the motor, while the waste pipe or hose extends from the exit connection 22 to the sink or other receptacle to which the waste water is delivered. These hose connections may, if desired, be made before the parts are supported, and having once been properly made may remain in place even when the parts of the apparatus are disassembled after use.

It will be seen from the foregoing description that the apparatus that I have invented and herein described may be cheaply constructed, is of simple nature and not liable to get out of repair, and may be constructed very largely from thin or sheet metal, and may be fabricated by means of dies, all of which tends to lightness of parts, cheapness of manufacture, and rigidity and strength of structure.

What I claim is:

1. A household motor apparatus adapted to be operated by fluid taken from a fixed source of supply, comprising a motor, fluid connections from the source of supply to the motor and for conducting away the fluid after it has done its work, an adjustable standard, and supporting connections between the standard and the motor adjustable with reference both to the standard and the motor.

2. A household motor apparatus adapted to be operated by fluid taken from a fixed source of supply, comprising a motor, fluid connections from the source of supply to the motor and for conducting away the fluid after it has done its work, a standard, means for securing the standard in a chosen location, and connections for supporting the motor from the said standard, such connections being adjustable lengthwise of the standard and angularly about the standard.

3. A household motor apparatus adapted to be operated by fluid taken from a fixed source of supply, comprising a motor, fluid connections from the source of supply to the motor and for conducting away the fluid after it has done its work, a standard, means for securing the standard in a chosen location, and connections for supporting the motor from the said standard, such connections being adjustable lengthwise of the standard and angularly about the standard, and being also constructed to permit the motor to be angularly adjusted with reference to the supporting connections.

4. A household motor apparatus adapted to be operated by fluid, including a motor having a casing, a rotor within the casing, a shaft, and divided clamp disks uniting the rotor to the shaft, the disks being fitted to engage the shaft and cause it to turn therewith and to engage with the rotor so as to move therewith, and means for conducting fluid to the motor and directing it against the blades of the rotor.

5. A household motor apparatus adapted to be operated by fluid, including a motor having a casing, a rotor within the casing, a shaft, and divided clamp disks uniting the rotor to the shaft, the disks being fitted to engage the shaft and cause it to turn therewith and formed with tangs which pass through openings in the rotor and engage with the disk on the opposite side thereof.

6. A household apparatus, comprising a fluid motor, a supporting bracket therefor, having divided arms engaging with the opposite sides of the motor casing, a screw for uniting the arms and holding them in engagement with the motor casing, and a standard on which the said bracket is supported, the motor being adjustable relative to its supporting bracket on loosening the screw.

7. A household apparatus, comprising a motor, a bracket for supporting the motor, a standard to which the bracket is adjustably secured, a removable clamp adapted to be secured to a support, and means for uniting the standard to the clamp.

8. A household apparatus, comprising a motor, a bracket for supporting the motor, a standard to which the bracket is adjustably secured, a roughened disk carried by the lower end of the standard, a clamp adapted to be applied to a support formed with a roughened disk-like extension to which the disk carried by the bracket may be fitted, and means for holding in intimate relationship the said disk-like parts whereby the standard may be adjustably supported relative to the clamp.

DWIGHT C. KELLOGG.